United States Patent [19]
Denis

[11] 3,800,537
[45] Apr. 2, 1974

[54] CONTROL SYSTEMS FOR OPERATING JACK UNITS

[75] Inventor: André Hector Denis, Garches, France

[73] Assignee: Matairco S.A., Palaiseau, France

[22] Filed: Oct. 8, 1971

[21] Appl. No.: 187,778

Related U.S. Application Data

[63] Continuation-in-part of Ser. No. 81,048, Oct. 15, 1970, abandoned.

[30] Foreign Application Priority Data

| Oct. 10, 1970 | France | 70.36680 |
| Feb. 26, 1971 | France | 71.06719 |
| Oct. 15, 1969 | France | 69.35304 |

[52] U.S. Cl. ........... 60/477, 60/481, 60/484, 91/420, 91/447
[51] Int. Cl. ........... F15b 15/18, F15b 13/42
[58] Field of Search ......... 60/52 HA, 464, 473, 477, 60/481; 91/420, 447; 254/93 H, 89 H

[56] References Cited
UNITED STATES PATENTS

| 2,286,880 | 6/1942 | Traut | 60/52 HA |
| 2,618,121 | 11/1952 | Tucker | 60/52 R |
| 2,620,160 | 12/1952 | Ray | 60/52 HA |
| 3,255,587 | 6/1966 | London | 60/52 HA |

FOREIGN PATENTS OR APPLICATIONS

| 603,795 | 6/1948 | Great Britain | 91/447 |

Primary Examiner—Edgar W. Geoghegan
Attorney, Agent, or Firm—John J. Byrne; Edward E. Dyson

[57] ABSTRACT

The invention refers to systems for controlling (lifting, tilting and like) operational movements by means of jack devices, which are responsive to differential operation and are checked by means of pump and similar power means used in connection with vehicles, lorries, trucks and the like, which may be equipped preferably with pivotable or swingable operator cabins.

8 Claims, 11 Drawing Figures

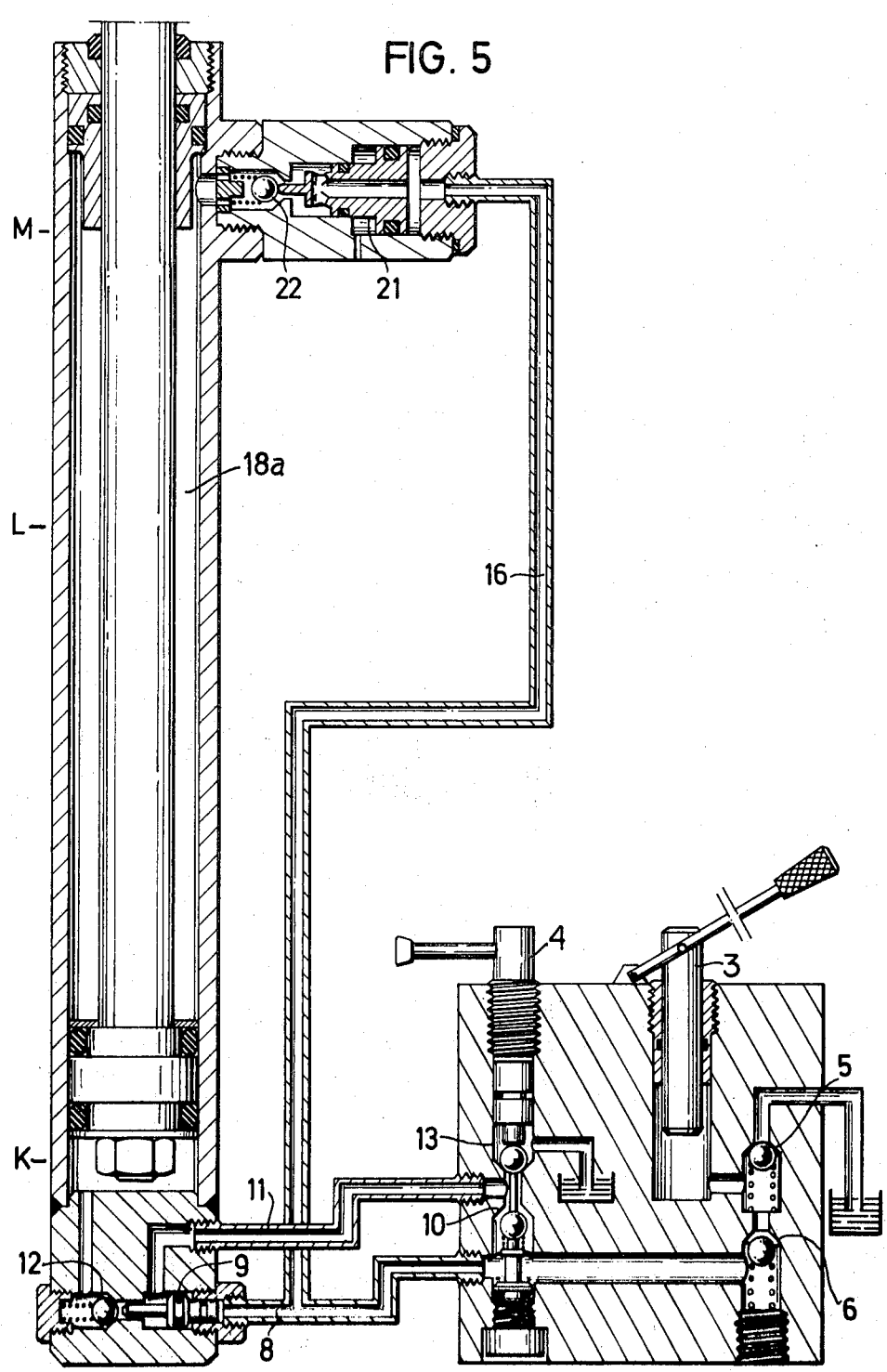

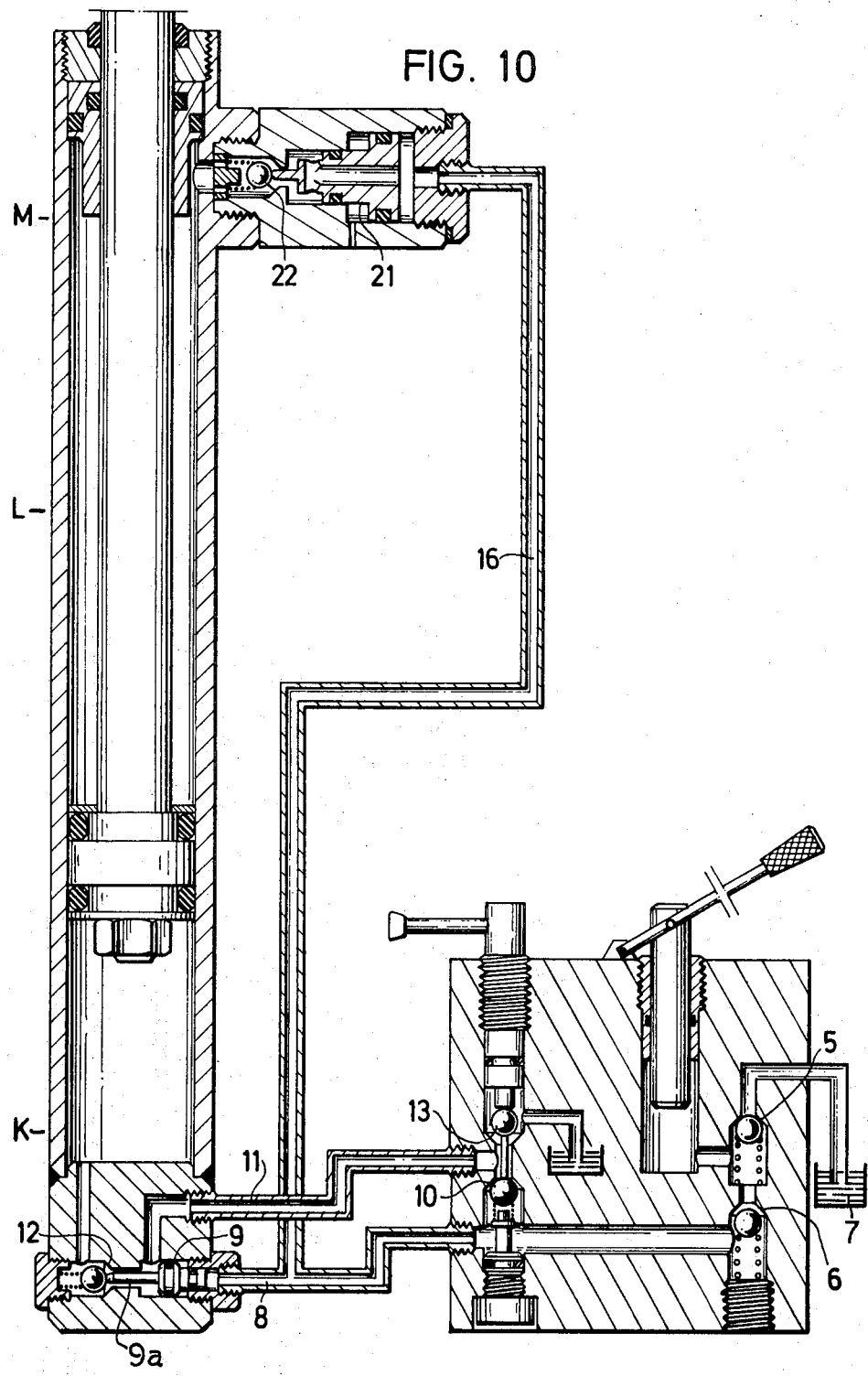

CONTROL SYSTEMS FOR OPERATING JACK UNITS

This application is a continuation-in-part application of my pending U.S. Pat. Application, Ser. No. 81,048, filed Oct. 15, 1970, now abandoned.

The invention is essentially directed to safety instrumentalities to protect operators and like service personnel from injuries, undesirable effects, etc., by preventing the operator to manipulate such jacks during lowering of the jack-piston assembly (below any raised or lifted load), in case of any sudden disturbances, such as fluid leakage due to damage or rupture of conduit or pipe connections between the jack means and the pump aggregate therefor. The control system concerns an apparatus equipped with remote control means including a valve array responsive to and operable also when any malfunction of the jack means and accessories thereof occurs.

SUMMARY OF THE INVENTION

In devices of the aforesaid type involving double-acting jack units efforts were heretofore made to meet the above problem by providing a stop-holding valve controlled by fluid or liquid under pressure delivered from a pump, which directs the liquid under pressure against the one or the other effective piston surface of the jack unit by means of the action of a four-way distributor arrangement. However, such known devices are complicated in operation and expensive in construction.

In hydraulic devices involving a single-acting jack, it becomes necessary to prevent the liquid from discharging from the jack by means of a hand controlled stop (valve) element arranged on the jack device itself. Thus it becomes clear that if such check or stop element were arranged at a remote location, say, at a distance from the jack device, for example mounted on the pump and connected to it by means of a pipe or conduit system, liquid escape, leakage or fluid loss due to rupture of such conduits should prevent it from carrying out its desired function, as any sudden or untimely stroke of the jack piston could not be ordinarily prevented.

But then, in order to operate such safety or check valve element, the operator had to place himself in the immediate proximity of the jack unit, may be even placed beneath the load or swingable truck cabin raised or pivoted by the said jack, which naturally becomes very dangerous if, for any reason, said load should suddenly or at an inopportune time drop before the operator has been able to actuate and block the check valve element, or when the latter unlocks itself.

The apparatus according to the invention radically avoids the aforesaid and other serious drawbacks and provides a complete safety due to the fact that, on the one hand the liquid under pressure contained in the jack unit is at all times contained within the same and, on the other hand any opening of the stop-holding or check valve — therefore the return of the load towards its starting point — is so to speak, remotely controlled by the pump operation. Therefore the operator no longer has to perform any manipulation at the jack unit itself in any position which would be dangerous to its personnel.

The apparatus according to the invention which is operated by means of a pump of a single or double action including at least one hydraulic jack unit equipped with means for effectuating a differential operation and is characterized by the fact that it comprises stop-hold means, e.g., in the form of a non-return or check valve which is directly incorporated in the jack unit, means being further provided to remotely control the actuation of this valve to its opening position, so that a pressure reduction takes place on a decompression or pressure release valve becomes activated which is situated preferably in the proximity of the pump aggregate of the jack, serving to control and check the piston movement of the jack when said release valve is closed.

According to the invention said control means are formed by a valve with differential valve end areas or sections arranged so as to push the check valve into its opening position when the pressure of the liquid coming from the pump is applied only against its smaller valve end or cross section, means being provided to apply the pressure against its two end surface areas when the decompression or pressure reduction valve is closed, and only against its smaller valve area when the said decompression valve is open.

Two conduits are employed of which one (which opens onto the face of the smaller valve cross section) is directly connected to the pump, while the other (which opens toward the face of the larger valve cross section) is connectable either to the pump or to a drainage outlet, depending on the fact whether the check or release valve is closed or open.

To this end the apparatus pursuant to the invention in the case of use of a pump-decompressor (pressure-reduction) assembly, comprises an auxiliary valve array capable of connecting together the aforementioned conduits, the said auxiliary valve extending in the direction of the decompression valve and being oriented to function in opposite directions. A slidable connector or crosspiece interconnects two displaceable or movable ball elements of which the auxiliary valve is comprised, so as to open one ball valve when the other ball valve is closed, and conversely.

It is therefore a primary feature of the invention to provide means controlling the piston movements of the jack device in relation to the retraction of the piston, which control means becomes effective in the course of the operation of the pump.

It is another important object of the invention to provide means implementing stoppage or retraction of the piston of the jack at any point of its travel.

These and other objects of the invention ensue from the following detailed description, which has reference to the attached drawings, the latter being exemplary and explanatory of the principles of the invention and being in no way restrictive thereof.

BRIEF DESCRIPTION OF THE DRAWINGS

In the drawings:

FIGS. 5, 7, 8 and 10 are certain cross-sections of a modified apparatus made in accordance with the invention, operable parts thereof being shown in different positions, to which reference is had in the specification.

DETAILED DESCRIPTION OF THE DISCLOSURE

Figure 1:
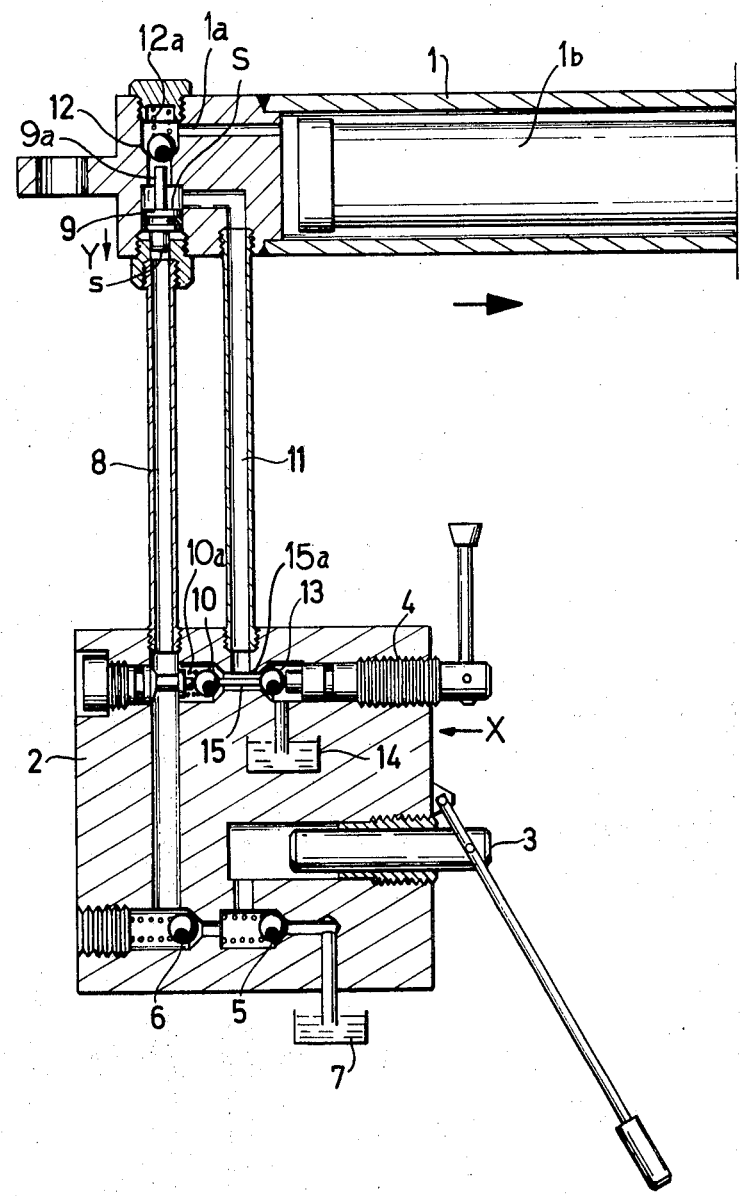
FIGS. 1 and 2 represent schematically one form of execution of the invention as applied to a jack unit, respectively, in the state corresponding to the outlet control of the jack piston and in the corresponding state or reentry or return of said piston.
Figure 2:
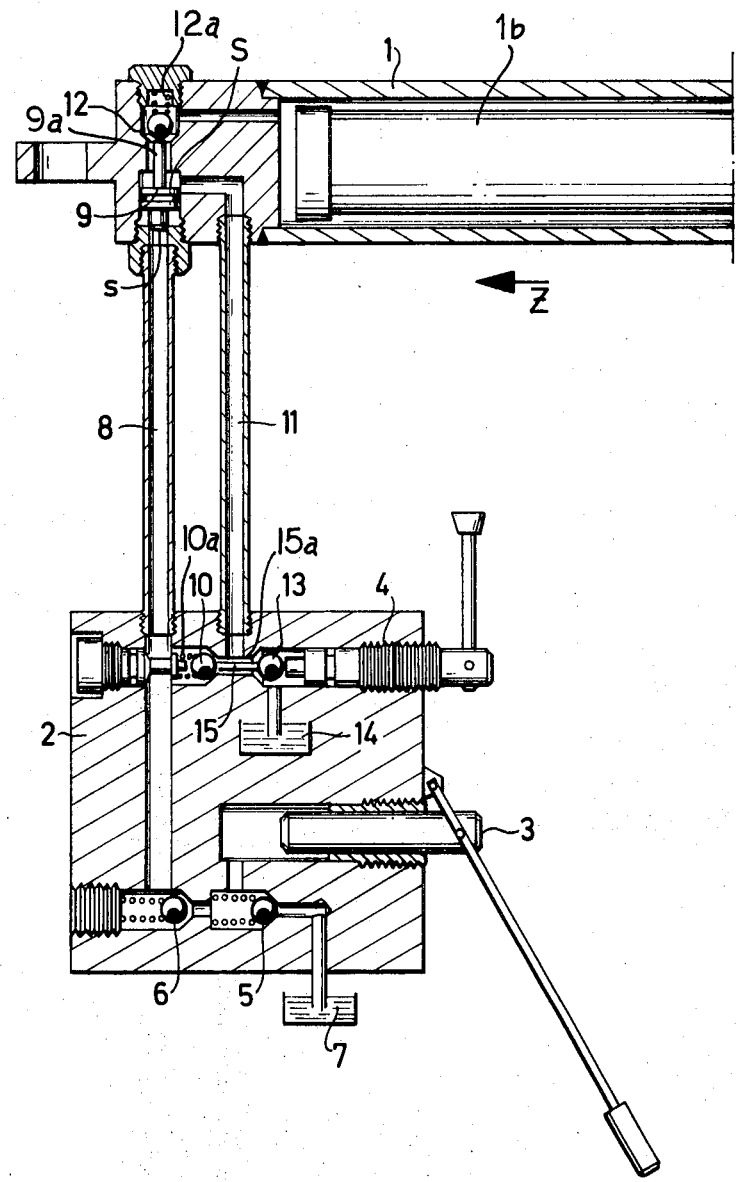
Figure 3:
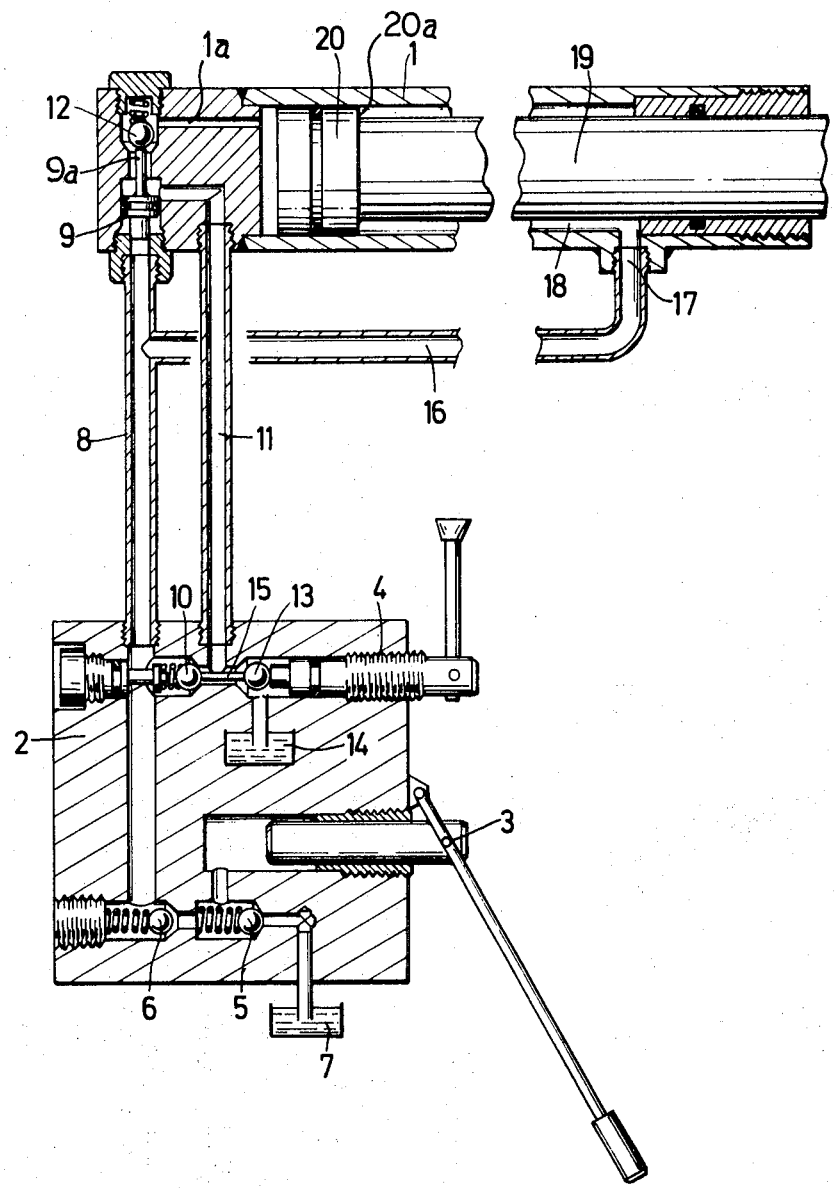
FIG. 3 represents the application of the invention to a double action jack with differential operation.

Referring more specifically to FIGS. 1 to 3 numeral 1 designates a jack unit with its cylinder and 2 a control block or base comprising a pump 3 and a decompression or pressure reduction screw device 4.

Pump 3, which comprises in a known manner a suction valve 5 connected to a reservoir of liquid 7 and a return valve 6, is connected by conduit 8 directly to a small end face or cross-section of a slide valve 9 of relatively small dimension. This valve 9 is comprised of a piston with two end sections $s$ and $S$, a spring-supported ball valve 10 being capable of establishing communication with conduit 11 which leads to the other or larger section $S$ of said valve 9.

A chamber provided above this latter section communicates by means of a non-return ball and spring-actuated valve 12 with the jack cylinder 1, whereas valve 9 has a finger 9a arranged so as to push when it is actuated in the desired direction, the ball valve 12 to assume an open position.

Conduit 11 may communicate by means of a valve 13 actuatable by decompression screw 4 with a fluid draining reservoir 14, which is generally the same as the aforesaid reservoir 7.

Finally a sliding connector or crosspiece 15 (of smaller diameter than that of the balls of valves 10 and 13) is arranged between the balls of said valves 10 and 13, and is capable of opening one valve when the other is closed, and vice versa.

The operation of this apparatus is briefly as follows:

The control action for lifting or raising of the jack is first described with reference to FIG. 1. In this stage it is important to distinguish between the periods of return stroke of the pump piston and its periods of suction or aspiration.

To control the raising (outward movement of the piston) of the jack, the decompression screw 4 is first tightened, therefore valve 13 is moved according to arrow X to closed position which, by displacing the intermediate crosspiece 15, prevents the valve 10 which is under tension of spring 10a, from closing. Therefore, through conduits 8 and 11, the pump communicates simultaneously with the two end faces $s$ and $S$ of differential slide valve 9; consequently both end faces being subjected to the same pressure. But as the force exerted against the large surface area S of the slide valve is then evidently greater than that exerted against the smaller surface area, the valve is pushed in the direction against the outer end face (arrow Y), thereby releasing valve 12, which closes under the action of its spring 12a and prevents any communication between the jack cylinder 1 and the outside. It will be therefore apparent that the reentry (inward movement) of the jack piston into the jack unit is positively opposed.

If the pump is then activated to pressurize liquid, the pressure of the latter below valve 12 through conduit 11 will be greater than the action of the spring influencing said ball valve, so that valve 12 will be lifted off its seat by the pressurized fluid in conduit 11 thus allowing the passage of the liquid into the jack cylinder via channel 1a, which causes consequently the lifting of the piston 1b.

In the intervals during the periods of delivery of the pump, that is during periods of the suction stroke of the pump piston, the pressure of the liquid against valve 12 will diminish, the latter will finally close under spring action again, thus cutting off the jack cylinder from liquid supply and the same process can repeat itself as long as the pump is operated.

A description of FIG. 2, explaining how the reentry or retraction of the jack piston can be constrolled may now be made.

First, the decompression screw 4 is untightened or loosened, which releases the ball valve 13, so that the spring 10a of valve 10 closes the latter, while crosspiece or connector rod 15 displaces, acts on and opens valve 13.

The larger end face S of valve 9 is thus subjected to atmospheric pressure through conduit 11, valve 13 and reservoir 14, while at the same time communication between conduits 8 and 11 is interrupted by closed valves 10 and 12, which are actuated by respective springs 10a and 12a.

However, the piston 1b of the jack unit is unable to further retract, for the outlet for the liquid in the jack cylinder 1 is prevented by valve 12 which is kept closed through action of spring 12a.

If the pump is then operated in the direction of discharge, the pumped liquid cannot reach the large end face section S of valve 9 through conduit 11 since it is stopped by closed valve 10. However, a pump liquid reaches the small end face section $s$ of this valve through conduit 8 upon further pump action. Consequently the smaller end face of said valve 9, not being subjected to an opposing fluid pressure action, is displaced from its seat and pushes through finger 9a the ball of valve 12 from its seat, which then opens and allows the liquid of the jack to flow toward the reservoir 14 via conduit 11 and ball valve 13; thus the jack piston can retract (see arrow Z).

The stopping of the return movement of the jack piston can be obtained, at any point of its course of travel, by tightening the pressure decompression screw 4 and closing exhaust of fluid in conduit 11 valve 13 into reservoir 7.

FIG. 3 shows the application of the invention to a double-acting jack device effective through differential operation.

In this modification conduit 8 which opens via differential valve 9 under the influence of differential sections $s$, $S$, comprises a pipe branch 16 which opens at 17 into cylinder 1 of the jacket unit, at the side opposite the location of non-return valve 12, so as to remain always in communication with the annular section space 18 between the rod 19 of the piston 20 and the inner wall of cylinder 1.

The operation of this modified embodiment during the return stroke of the piston is hereinafter set forth.

As previously indicated, the screw assembly 4 is first loosened, which opens valve 13 and allows for the closing of valve 10.

When the pump is then activated, the medium, e.g., oil under pressure, is sent through conduit 8 towards valve 9, which opens valve 12 via piston 9 and finger 9a. The oil contained in the jack unit, at the bottom or left end part thereof can therefore drain off through pipe 11 towards and into reservoir 14. At the same time the oil is sent through pipe 16 against the annular section face 20a of the piston 20. The piston is then pushed back towards the bottom of the cylinder 1, and the oil is completely discharged via pipe 11 to reservoir 14.

If then, under the effect of the load acting on the jack piston, the latter should tend to reenter or retreat into the cylinder at a speed greater than that resulting from the output of the pump 3, the pressure in the annular chamber 18 of the jack unit, as well as that in pipe 16 will be reduced, while the pressure will increase on the other side of the piston, and will effect the closing of valve 12.

It is clear therefore that the advantage from a safety standpoint, is the same as in the case when operating with a single-acting unit.

According to a further embodiment of the invention as depicted in FIG. 5, a second valve with differential cross-sectional surface areas is inserted in the pipe line 16. This second differential-action valve insures greater safety particularly in the case of the forward tilting of a cabin of an automotive truck (see FIGS. 4, 6 and 9). The vertical or center line of gravity of the load to be lifted or to be displaced passes beyond the points of articulation of the fluid-operated or hydraulic jack and of the load in question to be moved or pivoted. In fact, in this position, the thrust (push) to be developed when the vertical center line of gravity of the movable load passes between the point of articulation of the jack and the point of articulation of said load is transformed into traction (pull).

The device according to this variant permits controlling the displacement of the movable load under the same conditions as in the case of a thrust force.

FIGS. 4 to 10 illustrate schematically the arrangement of such a jack device in operation on a tilting cabin.

Figure 4:
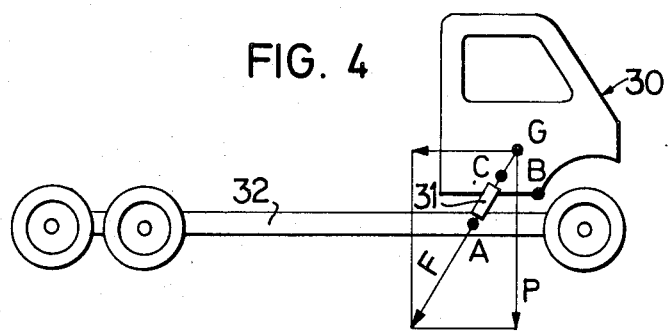
FIGS. 4, 6 and 9 illustrate schematically and in side elevation various operative positions of a swingable cabin, to which is applied an apparatus pursuant to the invention and which is joined to the chassis of a truck.

FIG. 4 illustrates the outline of a truck before the tilting of its cabin 30. The jack 31 is articulated at pivot A on the chassis 32 and at C on the cabin, and the cabin is articulated at B on the assembly of said chassis. In this position, the vertical center line of gravity G of the cabin, where its weight P is applied, passes between points A and B. The thrust force F acting on the jack device is then at a maximum; this force diminishing as the vertical center line of gravity approaches pivot point B.

Figure 6:
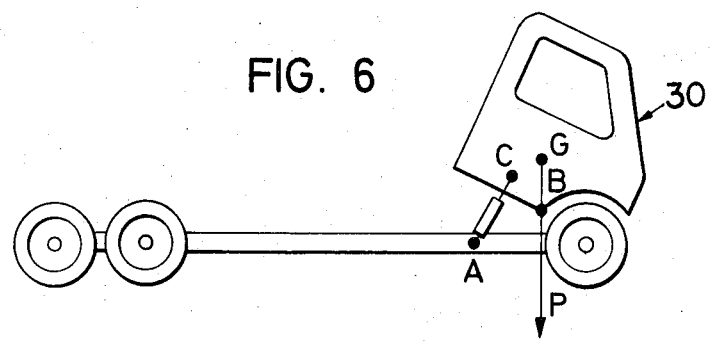

FIG. 5 represents a corresponding position of the device according to the invention. In this Figure, numeral 21 denotes a second differential valve, and 22 a ball valve associated with the same. K and M designate the two effective ends of the jack, and L the point of reversal of the cabin 30, when the center of gravity thereof coincides with its axis of articulation (FIG. 6). The tilting of the cabin corresponds to a work phase being exerted under thrust to the tilting point L (FIG. 5).

The thrust force is at a maximum value at K and decreases until it becomes zero at L. During pumping operation the pressure builds up in the cylinder body of the jack device, acts on the large cross-section of the differential valve 21, and thus maintains the valve 22 open. Under the effect of this pressure, the piston rod is extended, the oil and like fluid contained in the annular cross-section 18a between the cylinder and piston rod, and flows into the lower part or bottom of the jack thereby passing through valves 22, 12 and 10.

In the case of any leakage or of pipe rupture during the opening of the cabin, the pressure drop permits the two check valves to close, thus stopping the piston in its position.

FIG. 6 shows the truck cabin 30 in equilibrium, the vertical center line of gravity G-P thereof passing through its point of articulation B. The force F exerted on the jack is then zero.

Figure 7:
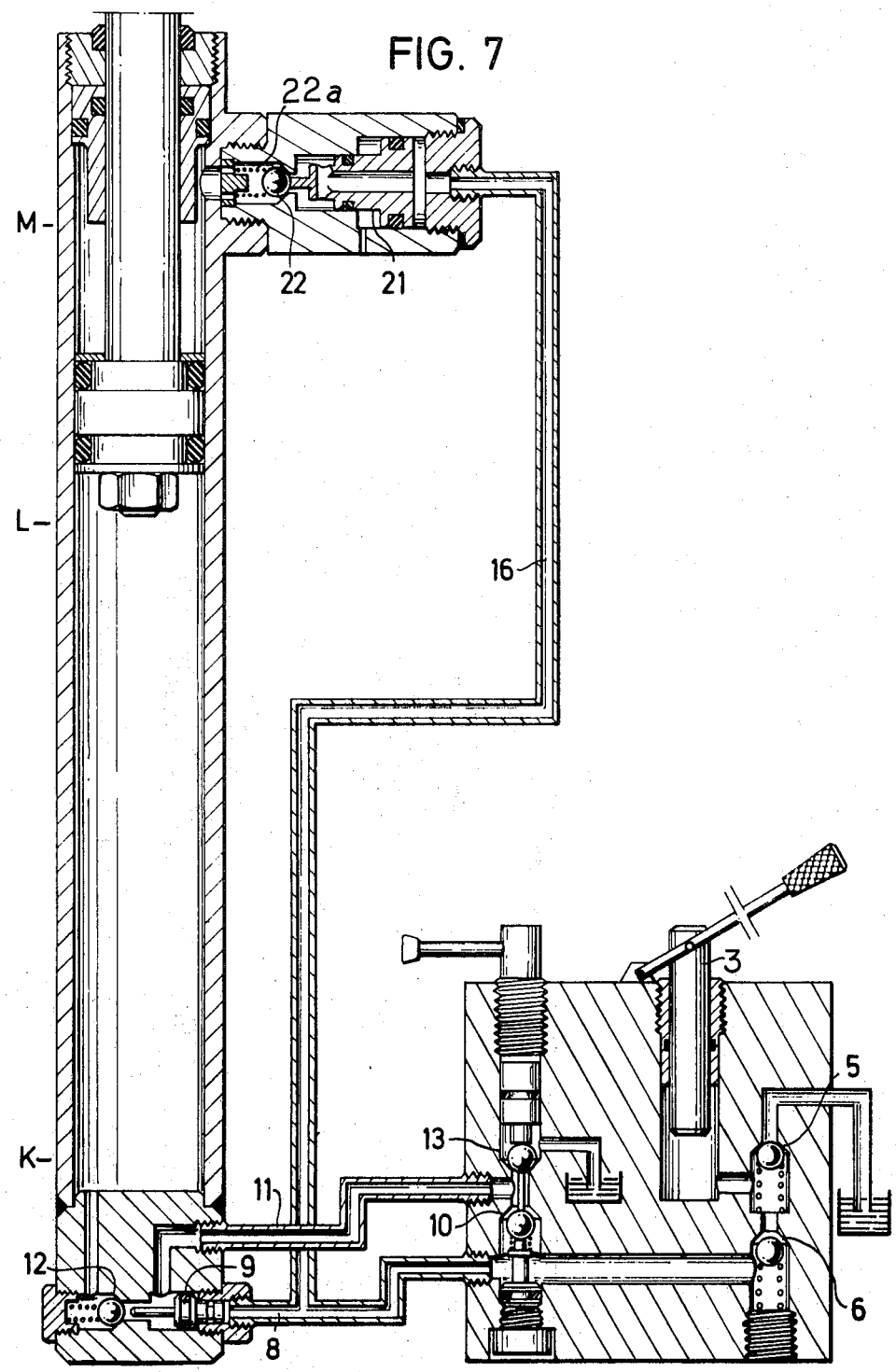
Figure 8:
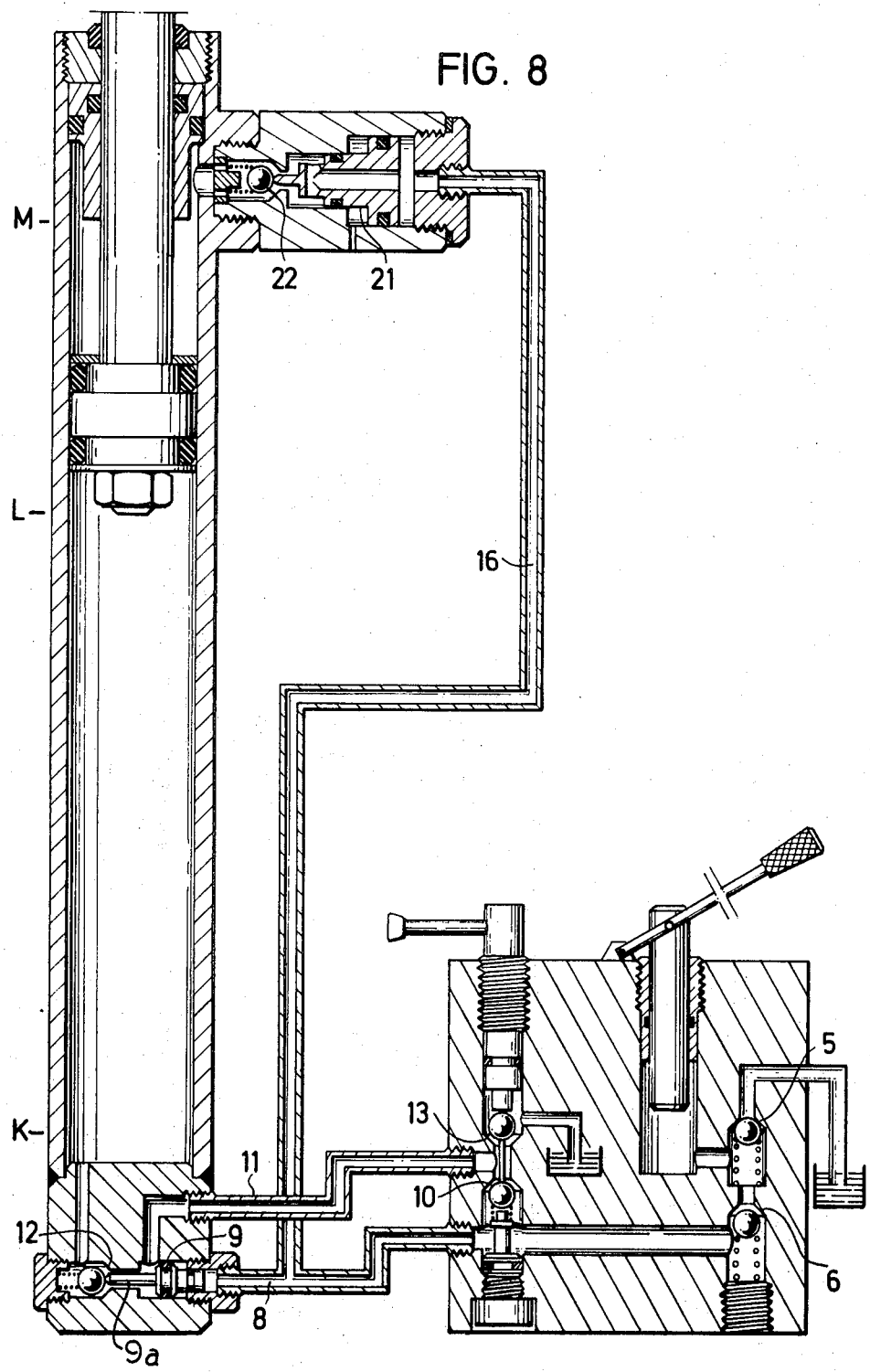

FIGS. 7 and 8 show, respectively, the positions of the jack device according to the invention corresponding to the tilting and to the return of the cabin 30.

In the case of FIG. 7, the torque T (not shown) equal to the weight of the cabin multiplied by the lever arm between its center line of gravity and its axis of articulation, becomes zero at L and maximum at M.

The vertical center line of gravity of the cabin passes in front of the axis of articulation thereof, so that the weight of the cabin exerts a pulling force on the piston rod, which involves the necessity of controlling the descent of the cabin.

In FIG. 7 at L, the pressure is zero in the jack device. The traction due to the weight of the cabin causes a pressure (which is greater than T) in the annular cross-section of the jack and the various pipe lines, up to valve 22, which has closed under the action of its spring 22a when the pressure has become zero at L. This causes the stoppage of further jack extension.

When the pump 3 is then actuated, the pressure builds up in the pipe installation and increases until it is able to open valve 22. When 22 is open, the piston descends under the action of force T, thus creating a negative pressure vacuum behind its piston at full cross-section, as well as in the valve 21 at its large cross-sectional area. The spring of valve 22 then returns the ball thereof onto its seat.

By continuing to operate the pump a complete tilting of the cabin is thus brought about. It is seen, therefore, that this phase of tilting operation is carried out and controlled by the pump.

FIG. 8 shows the position of the device for the return position of the swingable cabin. A decompressed state is achieved by opening valve 13 and closing of spring-supported valve 10, as previously explained. The load pressure is maximum at M and zero at L. When the pump is actuated, pressure builds up in the heretofore mentioned annular cross-sectional area of the jack and on the smaller surface area of the first differential valve 9, valve 12 being therefore held open, so that the piston rod reenters the jack or retracts therein.

Figure 9:
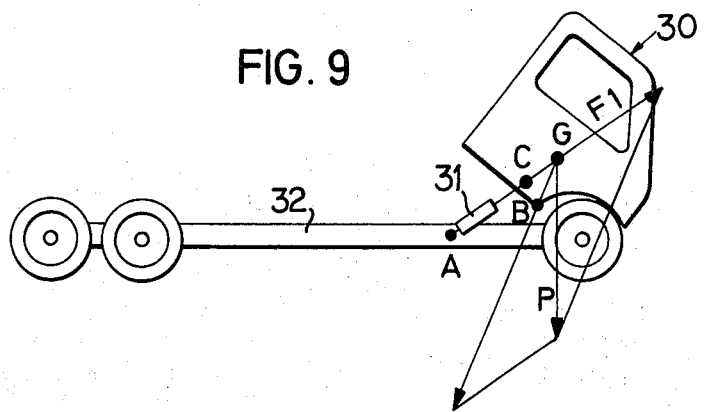

FIG. 9 schematically represents the truck during its return phase of the cabin. When the vertical center line of gravity G of the cabin passes in front of the point of articulation B thereof, the weight of the cabin 30 exerts a force $F_1$ which acts as a pulling force on the jack.

FIG. 10 illustrates the corresponding position of the jack device according to the invention.

When the center line of gravity of the cabin 30 passes behind the axis of articulation thereof, the load P tends to cause the piston rod to retract.

The pressure being zero at L, the valves 22 and 12, still shown open in FIG. 10, are then closed.

Valve 13 being open, the pump 3 is then operated until the pressure is sufficient to open valve 12 through the agency of projection 9a of valve 9. The opening of valve 12 permits the load to let the piston rod retract or go down, which creates a pressure drop in the annular cross-section of the jack cylinder. This pressure drop causes the closing of valves 22 and 12, thereby stopping or immobilizing the movements of the effective parts of the jack means. It suffices, however, to continue to operate the pump until the cabin is again in the normal or road position.

It is well understood that the pump may be just hand-operated, or a hydropneumatic pump mechanism may be employed.

A different embodiment of the invention has further for its object the adaptation of the jack device just described to the simultaneous control for two single- or double-action jack apparatuses.

In this system, the pipe lines connecting, respectively, the bottom and head valves of the jacks with the pump-decompressor block are connected in parallel.

Besides this the ball check valves are replaced by needles mounted on the aforesaid differential valves, the same being applied to their seats by spring means with a pressure higher by 25 percent to 30 percent than those which can prevail in the jack device when the latter develops its maximum force.

Figure 11:
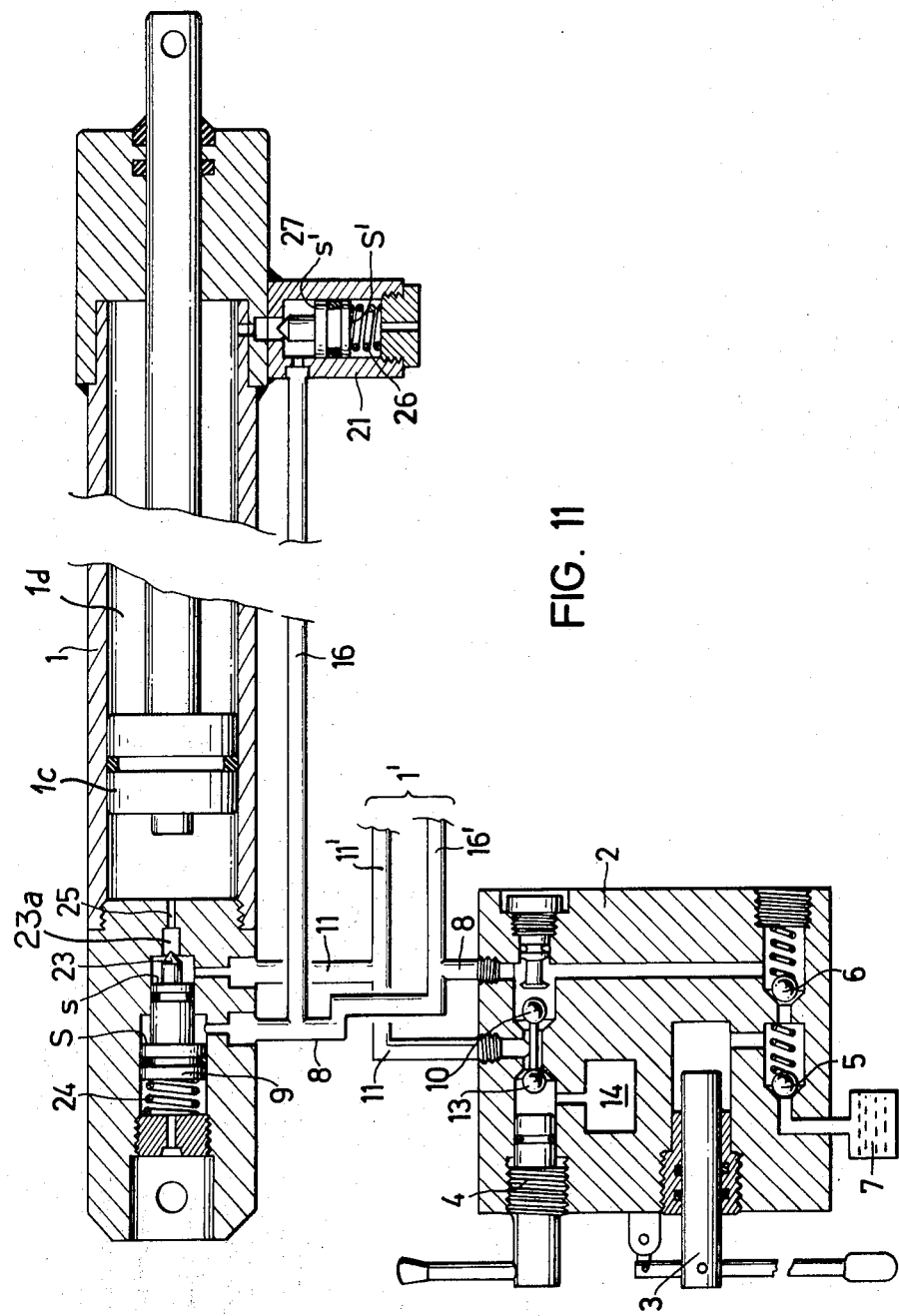
FIG. 11 depicts still a further modified apparatus pursuant to the invention, parts thereof being shown in section and being comprised of a set of two parallel-acting jack units (one of which being omitted for the sake of clarity), which are each equipped with differential duplex control systems.

The invention refers specifically to FIG. 11, which represents one of many possible forms of construction thereof disclosed by way of example.

When the auxiliary or remote control valve assembly 10–13 is in the position shown in FIG. 11, the oil issued from the reservoir 7 is delivered by pump 3 of block 2 simultaneously through the conduits or pipe lines 11, 11' and 16, 16' to the (lower) bottom and (upper) head openings of the two jack devices 1 and 1' (the latter being omitted, as it is identical in function and construction to jack device 1).

On the bottom side the fluid, i.e., oil acts both on the small cross-section $s$ and on the larger area of cross-section S of the first differential valve 9, thereby causing the displacement of this valve toward the left in FIG. 11 (against spring 24). Thus the freeing and making accessible opening 23a at the needle valve 23 will cause compression of the spring 24. The oil is thus discharged through channel-orifice 25 onto the full cross-section of piston 1c of the jack device 1 and the same is true for jack 1' (not shown) connected therewith in parallel.

On the piston rod side, the pressure acts on the small cross-section $s'$ of the differential valve 21, while fluid acting on the large cross-section area S' is discharged into the atmosphere, with the result of reducing the stress exerted on valve 21 by spring 26, so that the oil contained in the annular cross-section 1d of the jack device, that is, between its piston rod and its cylinder wall, can escape toward the full cross-section thereof, that is, toward its piston.

It is worthy to be noted that, since the jack devices are both connected to the tiltable cabin of the truck or vehicle, if, as a result of a slight difference of calibration of the valves, one jack device resists more than the other, the cabin ensures the simultaneouls entrainment or operation of both jack devices without the risk of damaging either of them or the cabin.

When the point of equilibrium of the cabin is transgressed, the latter tilts forward.

If it has the tendency to pull the pistons in the forward direction, the pressure is reduced or falls in the pipe lines, and the needle of the front valve closes again under the action of its spring, thereby assuring safety; the pump must be operated in order to cause continuation of the tilting action.

To return the cabin from the forward position to its point of equilibrium, it suffices to place the relief valve (decompressor valve) in the position opposite that position which is shown in FIG. 11.

The oil is then delivered to the forward valve 21, causing the latter to retract, so that the oil is admitted into the annular space 1d of the jack. On the other hand, namely, on the lower side, the oil acts on the large cross-section S of the slide valve 9 which retracts, thus permitting the oil present in the full cross-section of the jack cylinder to return directly to the reservoir 7.

To cause descent of the cabin from the point of equilibrium to its normal or "road" position, the operation continues as above. At the end of each pump stroke, the pressure falls in the respective pipe lines, and valve 9 on the bottom side of the jack then closes again under the action of its spring 24.

To better understand the operation of the jack device according to this execution of the invention, there will be given below a specific example, which, of course, is by no means to be considered in a restrictive or limitative sense.

It is supposed that the jacks must operate at a pressure of 200 bars. The needles are calibrated, as has been disclosed above, at a pressure of the order of $200 \times 1.25 = 250$ bars.

Let is be supposed also that the seats of the needles have a diameter of 2 millimeters, hence a cross-section of 0.0314 cm².

The force exerted by the spring thus is:

$$250 \times 0.0314 = 7.9 \text{ kilograms}$$

If the front valve has a diameter of 8 millimeters, hence a cross-section of 0.5026 cm², its opening pressure is $7.9 : 0.5026 = 15.8$ bars.

If the rear valve has respective diameters of 12 millimeters, or a cross-section of 1.1310 cm², and of 10 millimeters or a cross-section of 0.7854 cm², the opening pressure on the total surface is $7.9 : 1.1310 = 7$ bars and on the annular surface it amounts to $7.9 : 0.3456 = 23$ bars.

The operation of this device will now be set forth:
Start to lift the cabin

The first pump stroke releases a fluid pressure which comes to act on the cross-section areas $s$ and S of the rear control needles (FIG. 11) and of the area $s'$ of the front control needle, which retract to provide fluid or oil passage into the jack cylinder 1. If, as stated above, the pressure needed to displace the pistons of the jack devices is 200 bars, this pressure will act continuously on the control sections of the needles during the entire lifting operation and will keep them in open position. To automatically keep them in position with respect to the jacks will occur with each pump stroke, which is assured by valves 6 and 13 of the pump.

During the entire lift operation the calibration pressure of the needles will therefore not be added to that resulting from the weight of the cabin exerted on the jacks.

Location of equilibrium of the cabin

When force will be diminished on the jack units and pressure is reduced to 15.8 bars in the pipe lines, the front valve will close again. When the stress on the jack units is zero, a minimum pressure of 15.8 bars must be exerted to disengage the front needle valve. The rear valve will remain still open (at an opening pressure of 7 bars). The pressure of 15.8 bars will be produced by throttling the oil escaping from the annular cross-section at the front needle valve.

Forward Tilting Movement

The piston stroke causes the front needle valve to retract. The flow of oil is checked by the nozzle opening 27, and oil returns to the full cross-section of the jack piston by passing under the rear needle, the pressure of which is about 7 bars. At the end of the pump stroke, there will thus prevail 7 bars in the pipe lines, a pressure insufficient to lift the front valve arrangement (15.8 bars). The piston of the jack arrangement will therefore remain immobilized after each pump stroke by the closure of the front needle valves which remain on their seat due to spring action.

Return Movement

The first pump stroke causes the front needles valve 9 to retract, which will remain in this position as long as the pressure in the annular cross-section 1d is not less than 15.8 bars.

The calibration pressure of this valve will therefore not add to the nominal pressure.

Point of equilibrium

At least 15.8 bars must be supplied for the needle valve to become disengaged and for the piston to continue its return stroke.

Descent or return of the cabin to normal road position

The pump stroke first opens the front valves (15.8 bars), then the rear valves (23 bars). At the end of the pump stroke, the pressure prevailing in the pipe lines is at most 15.8 bars (calibration of the front valves), a pressure which is insufficient for maintaining the rear valves which close again and thus immobilize the piston of the jack arrangement.

During the entire descent, the pressure at the pump should not exceed 23 bars.

It should be noted that, in upward as well as downward movements, the rupture of a pipe line under pressure automatically causes the closing of the needle valves, which are returned to their seats through spring action.

It can thus be seen that there has been provided according to this invention pump-actuated hydraulic jack means equipped with safety instrumentalities to be activated by remote control means including means cooperating with stop-holding valve or check means to culminate in a great number of advantages and safety measures highly economical in execution and installation.

It can thus be seen that there has been provided in accordance with this invention a greatly simplified, accurate and reliable control system, which is equipped with at least one jack unit having a cylinder 1 and a fluid-driven piston with piston rod 1b for performing a load displacement by means of the piston 20, to which fluid is supplied by a pump 3; comprising at least two separate conduit means 8, 11 spacing said cylinder of said jack unit a predetermined relatively large distance from said pump and operatively interconnecting said cylinder with said pump, first control or check means 12 in one of said conduit means 8 located adjacent one end of said cylinder and in communication 1a with the latter, second control means 9 of the differential type slidably arranged in said one conduit means 8 for cooperation with said first control means 12 and substantially aligned with the latter, said second control means 9 being responsive to fluid flow through one or both of said conduit means, channel means or a passageway 15a interconnecting both said conduit means 8, 11 in the proximity of said pump, and interconnecting valve means 10, 15, 13 displaceable in tandem in said passageway 15a to direct flow of fluid from said pump through one or both said conduit means, respectively, when said interconnecting valves means 10, 13 are displaced in a preset position within said passageway 15a relative to said conduit means.

Operable means in the form of decompressor means 4 located adjacent said pump, which is incorporated in a base 2 remote from said jack unit are structured to carry out reciprocable movements to and fro the respective seats of said interconnecting valve means 10, 13, one of which latter 10 being spring-supported 10a at said one conduit means 8.

All the above and other modifications of the invention are covered by the latter in its broadest aspects and the invention is not considered to be limited to the specific embodiments herein shown and disclosed. Departures may be had without deviating from the principles of the invention and without sacrificing its numerous advantages.

What is claimed is:

1. A system of the type described including two jack units each having a piston rod together with a piston reciprocable in the respective jack unit cylinder, to which fluid is supplied by means of a pump via an array of pipe lines, which extend in parallel relative to said jack unit cylinders; a base carrying said pump, decompressor means accommodated in said base, said base being located remote from said jack units and being interconnected by means of said pipe lines, first spring-supported check means at one end of each jack unit for regulating the flow of liquid from said pump via said first check means to and from said one cylinder end, second spring-actuatable check means at the opposite end of each jack unit for controlling the flow of liquid to an annular space defined by the jack unit cylinder and the piston rod, both said first and second check means being of the differential type, and decompressor means cooperable with a valve-controlled passageway operatively connecting said pipe lines via said pump with said check means for activating simultaneously the movements of said pistons and piston rods of said units.

2. A control system equipped with at least one jack means having a cylinder and a fluid-operated piston therein for performing load displacements through the piston rod by means of a fluid action delivered by a pump; comprising conduit means spacing the cylinder of said jack means from said pump a predetermined relatively large distance from each other and operatively interconnecting said cylinder with said pump, first control means positioned adjacent one end of said cylinder and in communication therewith, first spring means cooperable with said first control means to normally close the access to said cylinder via said conduit means, second control means slidably arranged in said one conduit means, third control means positioned remote from said first and second control means and in the proximity of said pump, said third control means including spaced apart ball elements structured for displacement together in tandem and relative to said conduit means, channel means establishing communication between said pump and at least one of said conduit means, and operable means for actuating one of said ball elements of said third control means for placement of said one ball element to establish intercommunication between said conduit means, whereas upon displacement of said other ball element by said operable means said one ball element establishes connection with said other conduit means, said second control means being cooperable with said first control means so as to influence the position of the latter in order to maintain the same either closed under spring action or to change said position for discharge of fluid from said cylinder through one said conduit means.

3. A control system according to claim 2, said operable means being actuatable on either of said ball elements to displace same for establishing fluid communication from said pump to the respective cylinders of said jack means via said first control means and also via second control means, both said first and second control means being differentially structured for operation and being, respectively, positioned near opposite ends of said jack means for supply fluid under pressure from said pump to said jack means via said conduit means and for discharging said fluid from said cylinders of said jack means under predetermined operational conditions to a reservoir connected to said operable means.

4. A control system according to claim 3, wherein both said differential control means are provided with needle valve means, and spring means supporting both said control needle valve means during operation.

5. A hydraulic system comprising a pump, a fluid actuated jack having a cylinder and a first piston reciprocably received therein defining a working chamber, a reservoir, passageway means communicating said chamber with said pump and with said pump and with said reservoir, control valve means in said passageway means, said control valve means having a first position wherein said chamber is communicated to said pump and is pressurized upon actuation of said pump, and a second position wherein communication between said pump and said chamber is closed and the chamber is communicated to said reservoir to exhaust the fluid therein, a one-way check valve, means biasing said check valve to a normally closed position, in said passageway means between said chamber and said control valve means, said check valve being pushed to the open position by pressurized fluid when said control valve is in the first position and said pump is actuated, and a check valve actuating means responsive to pressure from said pump to push said check valve off its seat when said control valve means is in said second position, said check valve actuating means comprising a second passageway means leading from said pump to said first passageway means and intersecting therewith adjacent said check valve, an actuating piston slidably received in said second passageway means, said actuating piston having differential working surfaces on opposite ends thereof, one of said surfaces being exposed to said second passageway means, and the other of said surfaces being exposed to said first passageway means and being of an area greater than that of said one of said surfaces, whereby when said control valve means is in said first position, fluid pressure in said first and second passageway means will act on said working surfaces, and because of said differential surfaces, said actuating piston will be urged away from said check valve.

6. The system of claim 5 wherein said jack is a double-acting jack and including a second chamber on the side of said first piston opposite said first chamber, and including third passageway means between said second chamber and said second passageway means.

7. The system of claim 5 wherein said pump is hand operated and includes a housing, a pumping chamber having inlet and outlet means, a pumping piston reciprocably received in said chamber, and handle means for reciprocating said pumping piston.

8. The system of claim 5 wherein said control valve includes a pair of valve seats, one disposed between the reservoir and said chamber and the other disposed between the pump and said chamber, a pair of interconnected valve heads one of which seats on said one seat when said control valve means is in the second position, and the other of which seats on said other seats when the control valve means is in the second position, and means for alternately seating said valve heads on said seats.

* * * * *